Nov. 29, 1966  V. S. WAGNER  3,288,166
ACCUMULATOR SYSTEM
Filed Feb. 26, 1964
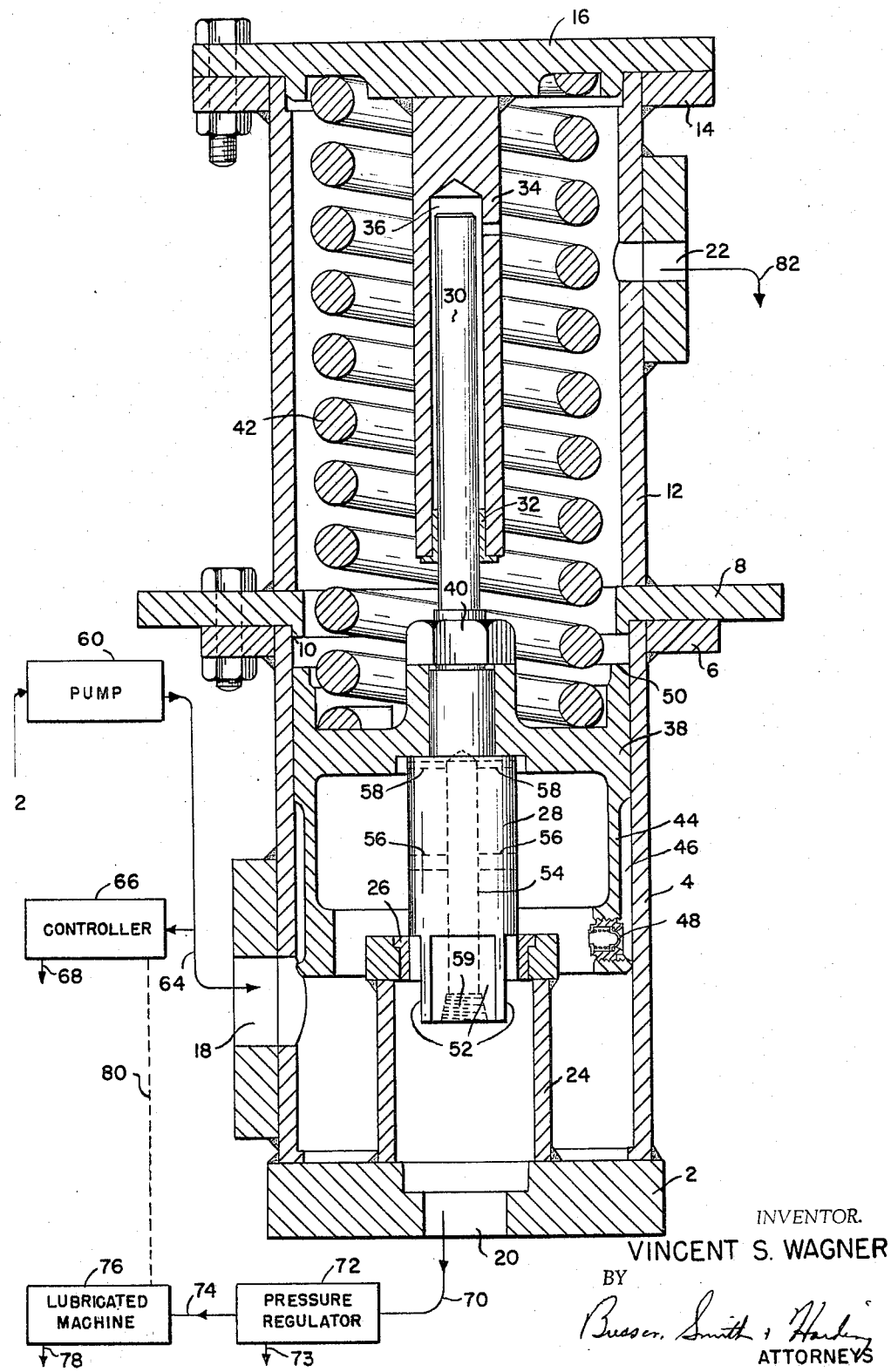
INVENTOR.
VINCENT S. WAGNER
BY
Busser, Smith & Harding
ATTORNEYS

3,288,166
ACCUMULATOR SYSTEM

Vincent S. Wagner, Lower Makefield Township, Bucks County, Pa., assignor to De Laval Turbine Inc., Trenton, N.J., a corporation of New Jersey
Filed Feb. 26, 1964, Ser. No. 347,520
4 Claims. (Cl. 137—509)

This invention relates to an accumulator system for the purpose of controlling conditions existing in an oil system involving a controller and providing lubricant to the machine which is being controlled.

Liquid-operated controllers are commonly used for many types of machines such as turbine or engine-powered plants, and it is generally economical to use as the operating liquid a lubricating oil, the pump for which not only supplies the oil for the controller but also supplies lubricant for the bearing surfaces of the machine involved. Under ordinary conditions, involving small load changes, controllers will consume little oil, the consumption of oil increasing only under large load changes which in most instances may occur infrequently. Accordingly, economy dictates that the oil pump should normally be of a size capable of supplying, for control purposes, only little more oil than small normal load changes will require plus that oil which is ordinarily required for lubrication. In such case an accumulator can be provided of sufficient capacity to take care of the relatively infrequent abnormal demands of the control system. Generally the control system requires a supply of oil at a pressure considerably exceeding that required to maintain lubrication, and it has been customary to pump the oil to the high pressure required for control, with reduction of this pressure in the supply to the lubricating system.

Common oil supply system for both control and lubrication, however, involves a possible hazard. While control systems are generally quite reliable, casualty conditions may occur due to either very abnormal demands of oil by the control system or due to some breakage of oil lines which might result in loss of supply for lubrication. These systems are supplied with safety devices which will trip the machines to shut down in the event of such an occurrence, but the operating parts of the machine involved may continue to coast for periods of several minutes during which time the bearings require oil for lubrication to avoid costly damage.

The general object of the present invention is the provision of a system including an accumulator in which the accumulator is not only provided to take care of the peak demands of a pressure regulator but also serves to maintain lubrication for a sufficient period to prevent damage in the event of some unusual situation which would normally deprive the lubricating system of its adequate supply of oil. In achieving this objective the accumulator also acts as a peak pressure regulator to maintain a peak pressure on the control oil supply.

The foregoing general object and other objects relating to details of construction and operation will become apparent from the following description, read in conjunction with the accompanying drawing in which the figure diagrams the system involved and shows a novel accumulator in axial section.

Reference may be first made to the accumulator which comprises a base 2 welded to a cylinder 4 provided with a top flange 6 to which is bolted a plate 8 provided with an annular lip 10 providing a stop for a piston operating in the cylinder. The plate 8 has welded to it a cylindrical wall 12 which is provided with a flange 14 to which is bolted a cover 16 providing a chamber for receiving oil leakage, and providing a housing for a spring.

The cylinder 4 is provided with an inlet port at 18 for connection to an oil supply line and with an exit port 20 connected to the lubricating system. An outlet 22 in the cylinder 12 is connected to piping to return leakage oil to the oil supply sump.

Surrounding the outlet port 20 and secured to the base 2 there is a cylinder 24 provided with a bushing 26 within which there is mounted for vertical reciprocation the lower portion of plunger 28 which has an upper continuation 30 guided in a bushing 32 carried by a member 34 which has a bore 36 in which the upper end 30 of the plunger may move. A piston 38 is secured to the plunger by a nut 40, and the upper end of this piston is provided with a socket for reception of a lower end of a strong compression spring 42 reacting between it and the cover plate 16.

As indicated, the piston is provided with a skirt portion 44 provided with an annular groove 46. A spring-closed check valve 48 capable of opening inwardly is carried by the piston skirt and, when open, provides communication between the groove 46 and the space inside and below the piston skirt. The upper edge 50 of the piston is arranged to engage the stop flange 10 when the piston is in its uppermost position.

The lower end of the plunger 28 is machined to provide flutes 52 through which oil flow may take place under certain conditions past the bushing 26. The plunger 28 is also provided with a central opening 54 communicating through a group of larger drilled openings 56 and a group of smaller drilled openings 58 with the space outside the plunger and below the piston. The tapped end 59 of the opening 54 may, if desired, receive a plug provided with an orifice to control flow of oil, whether or not such plug is used depending on the particular flow requirements.

Diagrammed in association with the accumulator just described are the generally conventional elements of the system in which it is incorporated, these being merely diagrammed because they may vary considerably in nature depending on the particular system elements involved.

A pump 60 which may be driven by the machine involved or by a separate motor or other power drive device receives oil from the supply sump through a connection indicated at 62 and supplies the oil to a line 64 communicating with the inlet port 18. The pressure in this line will be sufficiently high for controller operation when controlled as later described. The oil supplied at this point may, for example, be of the order of 75 pounds per square inch. To the line 64 there is connected the oil inlet to the controller 66 which may be of any of many types. This controller will usually be of the supply and waste type, returning the waste oil through a connection 68 to the supply sump. Under ordinary conditions of operation involving relatively small load changes the waste oil will be small in quantity.

The outlet 20 is connected to a line 70 to deliver oil to a pressure regulator 72 of conventional type adapted to reduce the oil pressure to what is required for proper lubrication. Typically this pressure will be of the order of 10 to 15 pounds per square inch. This oil is delivered through connection 74 to the bearings or other elements of a machine 76 requiring lubrication. The waste oil from the bearings flows through connection 78 back to the oil supply sump. The lubricated machine indicated at 76 will ordinarily be that controlled by the controller 66. For example if the lubricated machine is a turbine power plant, the controller may be used to regulate the supply of steam, gas or fuel to the turbine, typically for maintaining constant speed under varying load conditions. Mechanical control connections are indicated at 80.

Leakage oil from the chamber within the cylinder 12 passes out the opening 22 through connection 82 to the oil supply sump.

The accumulator may have any suitable dimensions to take care of the demands thereon, and what is required in this respect will be obvious from consideration of the following operation.

Assuming starting conditions, the piston 38 will be in its lowermost position resting on the upper end of the member 24. At this time the groove 46 will be in communication with the inlet port 18 and the openings 56 will be below the bushing 26. Operation of the pump will produce flow through the check valve 48 into the space below the piston, and since the output of the pump will be in excess of lubrication requirements, the piston will be raised compressing the spring 42. As soon as the piston starts moving upwards communication between the space below the piston with the lubricating outlet 20 is provided through the small openings 58 and bore 54. As upward movement continues, the port 18 will be uncovered by the lower end of the skirt of the piston and ultimately, assuming normal controller requirements of oil, the piston will move upwardly to a position in which its upper edge 50 is slightly spaced from the stop flange 10, this flange limiting the upward movement. The condition thus assumed will be slightly higher than that illustrated, and consequently oil may flow from the inlet port 18 through three passageways to the outlet 20, that is, through the openings 58, through the openings 56, and through the flutes 52 the upper ends of which will be above the top of the bushing 26. The flow to the lubricating system will then be quite free except to the extent that the pressure regulator 72 by its control action in reducing pressure to that suitable for lubrication reduces the flow. However, since the pressure regulator 72 is of a type which returns to the supply sump oil in excess of that required for lubrication at the desired pressure, this return being indicated at 73, the accumulator may be used to maintain a substantially constant pressure in the line 64. This action may be secured by suitable dimension of the flow passages provided by the flutes with respect to the strength of the spring 42, and in effecting this action the upper edges of the flutes 52 will cooperate with the upper edge of the bushing 26 to control flow. If pressure below the piston rises, the bypasses afforded by the flutes will open, while if the pressure drops they will close. If the openings 56 and 58 are relatively restricted, in comparison with this bypass, or if a plug with a suitable orifice is located at 59, this back pressure control action may be made whatever is desired. Under these conditions the piston will float around the position which is illustrated in the drawing, i.e. the upper edges of the flutes will be close to the upper edge of the bushing 26.

With ordinary oil demands by the controller, operation will take place as just indicated, the piston moving relatively slightly to accommodate the controller demands with a substantially constant flow of oil to the lubricating system. These conditions are the ones for which pump delivery may be designed: i.e., the pump will be sized and powered to deliver oil at the pressure little higher than that required by the controller with the volume of flow sufficient to supply the oil for lubrication plus that required for normal controller operation plus the minor amount to take care of leakage conditions past the piston 38. With ordinary small clearances for sliding fit of the piston this last leakage will be negligible even without any special packing.

If large load changes on the machine 76 produce a demand for larger flow of oil to the controller 66 for its operation, the accumulator automatically takes care of the requirements by downward displacement of the piston 44 by the action of the spring 42 this displacement first closing off the flutes and then being effective to produce a flow of oil outwardly through the port 18 to the controller to fit its excess demands. The pump 60 continues to supply part of the demand, but as has been indicated, economical design would dictate the use of a pump which would be inadequate to supply both the oil for lubrication and abnormal demands of the controller. With proper design for reasonably expected abnormal requirements of the controller, the action just described would occur without the piston's being lowered to a level cutting off the port 18; in other words, the range of this action would involve movement of the lower end of the piston skirt between the upper and lower limits of the port.

In the event of highly abnormal demands of the controller, the controlled machine should shut down, and devices for effecting this result would be provided in conventional fashion. These are well-known in this art and need not be described. One type of abnormal operation would, of course, be some breakage or abnormal leakage in the controller. If this occurs, while the driving power to the machine (such as a turbine power plant) would be cut off and the load on the turbine would also be normally cut off, for example by opening of the electrical lines supplied by a driven generator, the turbine and the generator driven thereby would ordinarily coast for a considerable period, and would require continued lubrication. Under these circumstances, the piston skirt would cut off the port 18 and thereafter the spring 42 by further displacement of the piston would continue to supply oil required for lubrication. The holes 56 are so located as to be closed off by the bushing 26 substantially at the same time as the piston closes the port 18, but oil displaced by the piston will flow inwardly through the smaller holes 58 to continue the lubricating action though possibly with a reduced, but adequate, rate of flow of the lubricating oil. The spring 42 is designed so that even if the piston approaches the lower end of its stroke the pressure of the oil will still be adequate for the continued lubrication.

It will be evident that various details of construction and operation may be changed without departing from the invention as defined in the following claims.

What is claimed is:

1. An accumulator-regulator comprising means including a movable wall providing a variable volume chamber for a liquid, means providing a force acting on said movable wall in a direction to reduce the volume of said chamber, means providing a first passage for inflow of liquid to said chamber, means providing a second passage for flow of liquid out of said chamber, means movable with said wall effective to close off said first passage against flow of liquid outwardly therethrough from said chamber when the volume of the chamber decreases below a predetermined volume greater than the minimum volume of said chamber, and means movable with said wall to restrict variably flow of oil from the chamber through said second passage, the last mentioned means providing less restriction to flow as the volume of the chamber increases and providing more restriction to flow as the volume of said chamber decreases.

2. An accumulator-regulator comprising means including a movable wall providing a variable volume chamber for a liquid, means providing a force acting on said movable wall in a direction to reduce the volume of said chamber, means providing a first passage for inflow of liquid to said chamber, means providing a second passage for flow of liquid out of said chamber, means movable with said wall effective to close off said first passage against flow of liquid outwardly therethrough from said chamber when the volume of the chamber decreases below a predetermined volume greater than the minimum volume of said chamber while permitting liquid flow into the chamber through said first passage, and means movable with said wall to restrict variably flow of oil from the chamber through said second passage, the last mentioned means providing less restriction to flow as the volume of the chamber increases and providing more restriction to flow as the volume of said chamber decreases.

3. An accumulator-regulator comprising means including a movable wall providing a variable volume chamber for a liquid, means providing a force acting on said movable wall in a direction to reduce the volume of said chamber, means providing a first passage for inflow of liquid to said chamber, means providing a second passage for flow of liquid out of said chamber, means movable with said wall effective to close off said first passage against flow of liquid outwardly therethrough from said chamber when the volume of the chamber decreases below a predetermined volume greater than the minimum volume of said chamber, and means movable with said wall to restrict variably flow of oil from the chamber through said second passage, the last mentioned means including a plurality of passages communicating with said second passage and means opening said passages of said plurality to said chamber successively as the volume of said chamber increases to provide stepwise less restriction to flow as the volume of the chamber increases and to provide stepwise more restriction to flow as the volume of said chamber decreases.

4. An accumulator-regulator comprising means including a movable wall providing a variable volume chamber for a liquid, means providing a force acting on said movable wall in a direction to reduce the volume of said chamber, means providing a first passage for inflow of liquid to said chamber, means providing a second passage for flow of liquid out of said chamber, means movable with said wall effective to close off said first passage against flow of liquid outwardly therethrough from said chamber when the volume of the chamber decreases below a predetermined volume greater than the minimum volume of said chamber while permitting liquid flow into the chamber through said first passage, and means movable with said wall to restrict variably flow of oil from the chamber through said second passage, the last mentioned means including a plurality of passages communicating with said second passage and means opening said passages of said plurality to said chamber successively as the volume of said chamber increases to provide stepwise less restriction to flow as the volume of the chamber increases and to provide stepwise more restriction to flow as the volume of said chamber decreases.

References Cited by the Examiner
UNITED STATES PATENTS

| 2,162,898 | 6/1939 | Rotter | 137—512.1 |
| 2,538,364 | 1/1951 | James et al. | 137—540 |
| 2,633,147 | 3/1953 | Badami | 137—509 |
| 2,668,555 | 2/1954 | Bartolat | 137—509 |
| 2,672,881 | 3/1954 | Jay et all | 137—500 |
| 2,783,087 | 2/1957 | Rainson et al. | 137—509 |
| 3,073,338 | 1/1963 | Cholvin et al. | 137—509 |
| 3,122,162 | 2/1964 | Sands | 137—504 |

M. CARY NELSON, *Primary Examiner.*

W. CLINE, *Assistant Examiner.*

PO-1050
(5/69)

UNITED STATES PATENT OFFICE
CERTIFICATE OF CORRECTION

Patent No. 3,288,166           Dated November 29, 1966

Inventor(s)    Vincent S. Wagner

It is certified that error appears in the above-identified patent and that said Letters Patent are hereby corrected as shown below:

In line 5 of the caption of said patent, "a corporation of New Jersey" has been amended to read --a corporation of Delaware--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents